US 9,623,906 B2

(12) United States Patent
Rohlfs et al.

(10) Patent No.: US 9,623,906 B2
(45) Date of Patent: Apr. 18, 2017

(54) PARK-STEER ASSIST SYSTEM AND METHOD FOR OPERATING A PARK-STEER ASSIST SYSTEM

(75) Inventors: Michael Rohlfs, Roetgesbuettel (DE); Volkmar Schoening, Wedemark (DE); Frank Schwitters, Koenigslutter (DE)

(73) Assignee: VOLKSWAGEN AG, Wolfsburg (DE)

( * ) Notice: Subject to any disclaimer, the term of this patent is extended or adjusted under 35 U.S.C. 154(b) by 1804 days.

(21) Appl. No.: 12/158,971

(22) PCT Filed: Nov. 27, 2006

(86) PCT No.: PCT/EP2006/011345
§ 371 (c)(1),
(2), (4) Date: Nov. 17, 2008

(87) PCT Pub. No.: WO2007/079825
PCT Pub. Date: Jul. 19, 2007

(65) Prior Publication Data
US 2009/0259365 A1    Oct. 15, 2009

(30) Foreign Application Priority Data

Dec. 23, 2005    (DE) .................. 10 2005 061 909

(51) Int. Cl.
*B62D 15/02*    (2006.01)
(52) U.S. Cl.
CPC .................. *B62D 15/028* (2013.01)
(58) Field of Classification Search
USPC ........................................... 701/41
See application file for complete search history.

(56) References Cited

U.S. PATENT DOCUMENTS 6,038,496 A    3/2000  Dobler et al.
6,154,695 A *  11/2000 Shimizu et al. ............. 701/41
(Continued)

FOREIGN PATENT DOCUMENTS

DE    38 27 729    3/1990
DE    195 07 957   9/1996
(Continued)

OTHER PUBLICATIONS

International Search Report, PCT International Patent Application No. PCT/EP2006/11345, dated Feb. 27, 2007.
(Continued)

*Primary Examiner* — Shelley Chen
(74) *Attorney, Agent, or Firm* — Andrews Kurth Kenyon LLP (57) ABSTRACT

The method relates to an operating method for a semi-automatic park-steer assist system and to a semi-automatic park-steer assist system of a motor vehicle for aiding in an alignment of the motor vehicle in a parking space, including a device for detecting an activation signal; a device for determining a change direction in which an alignment of the motor vehicle is to be changed; a device for detecting a set drive direction; and a control unit which controls at least one actuator in an active state of the park-steer assist system such that steerable wheels of the motor vehicle are turned in the change direction when the set drive direction is forward, and the steerable wheels are maximally turned counter to the change direction when the set drive direction is reverse.

20 Claims, 3 Drawing Sheets

(56) References Cited

U.S. PATENT DOCUMENTS

| | | |
|---|---|---|
| 6,856,874 B2 * | 2/2005 | Weilkes et al. ............... 701/45 |
| 7,088,262 B2 * | 8/2006 | Schindler et al. ......... 340/932.2 |
| 7,358,864 B2 * | 4/2008 | Mori et al. ............... 340/932.2 |
| 7,469,765 B2 | 12/2008 | Spannheimer et al. |
| 2003/0167113 A1 * | 9/2003 | Weilkes et al. ............... 701/45 |
| 2003/0210157 A1 | 11/2003 | Gotzig et al. |
| 2004/0020699 A1 | 2/2004 | Zalila et al. |
| 2004/0130464 A1 * | 7/2004 | Schindler et al. ......... 340/932.2 |
| 2005/0085984 A1 * | 4/2005 | Uhler et al. ................... 701/70 |
| 2005/0270177 A1 * | 12/2005 | Mori et al. ............... 340/932.2 |
| 2006/0052917 A1 * | 3/2006 | Schwarzhaupt et al. ....... 701/29 |

FOREIGN PATENT DOCUMENTS

| | | | | |
|---|---|---|---|---|
| DE | 102 20 426 | 11/2003 | | |
| DE | 102 20 427 | 11/2003 | | |
| DE | 102 50 021 | 5/2004 | | |
| DE | 102 56 770 | 6/2004 | | |
| DE | 103 24 810 | 12/2004 | | |
| DE | 10331235 | 2/2005 | | |
| DE | 103 54 661 | 6/2005 | | |
| FR | 2 728 859 | 7/1996 | | |
| JP | H09-95255 A | 4/1997 | | |
| JP | 2000-095124 | 4/2000 | | |
| JP | 2000095124 A | * | 4/2000 | ............... B62D 5/04 |
| JP | 2003-237511 A | 8/2003 | | |
| RU | 12676 U1 | 1/2000 | | |
| WO | WO 2004/059408 | 7/2004 | | |
| WO | WO 2006/034923 | 4/2006 | | |

OTHER PUBLICATIONS

International Preliminary Report on Patentability and Written Opinion, PCT International Patent Application No. PCT/EP2006/11345, dated Sep. 2, 2008 (English-language translation).

"Driving a passenger vehicle, study guide," DOCAAF, Moscow, p. 61-62, Fig. 20 (1984).

German Office Action and Search Report, issued in corresponding German Patent Application No. 102005061909.6.

Russian Office Action, issued in corresponding Russian Patent Application No. 2008130361.

Japanese Office Action, issued in corresponding Japanese Patent Application No. 2008-546165.

International Search Report and Written Opinion, issued in corresponding PCT International Application No. PCT/EP2006/011345.

European Office Action, issued in corresponding European Patent Application No. 06818839.0.

Chinese Office Actions, issued in corresponding Chinese Patent Application No. 200680048960.9.

German Office Action, dated Jun. 6, 2014, issued in corresponding German Patent Application No. 10 2005 061 909.6.

* cited by examiner

PARK-STEER ASSIST SYSTEM AND METHOD FOR OPERATING A PARK-STEER ASSIST SYSTEM

FIELD OF THE INVENTION

The present invention relates to a park-steer assist system and to a method for operating a park-steer assist system, by which an alignment of a motor vehicle in a parking space is able to be facilitated.

BACKGROUND INFORMATION

Modern motor vehicles often include park assist systems. Park assist systems may encompass a variety of assistance functions. These include, for example,
 a) distance warning (park distance control—PDC);
 b) display of information about the suitability of a parking space, e.g., its dimensions;
 c) driver assistance during parking, which may include the specification of a steering angle or even an automatic steering intervention; or
 d) fully automatic parking.

The assistance functions c) and d) usually require a steering intervention. This means that the steering of the motor vehicle must be actively modified during the course of the parking operation. This steering intervention may be implemented by the motor vehicle itself, in an automatically controlled manner. In the assistance functions c) and d), the motor vehicle calculates a setpoint path along which the motor vehicle is parked, or is to be parked, in the parking space.

A collision warning device for motor vehicles, which offers a functionality according to a), is described in German Published Patent Application No. 38 27 729. With the aid of the device described there, it is determined whether there is a risk of colliding with an obstacle on a course taken by the motor vehicle.

Described in German Published Patent Application No. 102 20 426 and German Published Patent Application No. 102 20 427 are park assist system which determine a size of a parking space, use it to calculate a potential parking sequence for the motor vehicle, and output instructions to a driver as to which direction the steering wheel has to be turned and in which manner the driver is to accelerate or brake the motor vehicle. Both documents also mention a specific arrangement in which the driver actuates the steering system and accelerates and brakes the motor vehicle independently. Furthermore, in each case a separate specific arrangement is described in which the vehicle is parked in or pulled out of a parking space in a fully automatic manner without a steering intervention and without an acceleration and/or a braking intervention. In addition, in German Published Patent Application No. 102 20 427 the advantageous sequence of pulling in and out of a parking space is visually displayed to the driver on a display device.

Furthermore, German Published Patent Application No. 103 54 661 describes a park assist system which is able to determine the size of a parking space, calculate a setpoint path, and provide a driver with information and instructions in connection with the parking operation, so that the driver can park the motor vehicle in the parking space along the specified setpoint path. The steering may be implemented automatically during a first, single-pass parking operation. In a different specific arrangement, it is provided that information about a steering direction and driving direction may be output for maneuvering.

PCT International Published Patent Application No. WO 2004/059408 describes a park assist system in which the parking space and the motor vehicle are shown to the driver together with a setpoint trajectory in a plan view of the parking situation. A slanted representation of the motor vehicle with respect to the parking space indicates that the driver can still align the vehicle in the parking space at the end of the parking maneuver in order to bring about an optimal parking position for the motor vehicle.

Park assist systems which park a motor vehicle in a fully automatic manner have a few inherent drawbacks. In fully automatic operations people tend to take their supervisory duties less seriously than they should. As a result, there is the risk that the driver of a motor vehicle equipped with a park assist system for fully automatic parking will neglect his duties of monitoring the parking space especially with regard to persons moving inside the area of the parking space. Furthermore, in particular for an inexperienced driver, it is not easy to predict which driving movements the motor vehicle will execute during parking. This makes it even more difficult to carry out the control duties. Assigning the control duties entirely to the motor vehicle requires very complex sensor systems that include redundancy and diversity, since movable objects, in particular, are difficult to detect by a motor vehicle. If a movable object, e.g., another moving motor vehicle, is not detected as a moving object, then the risk of a collision increases. It is for this reason that park assist systems which actively involve the driver in the parking operation so that he may tend to the supervisory duties but which still relieve him of a portion of the tasks during parking, are preferred these days.

The conventional semi-automatic park assist systems all have in common that they can render assistance in a one-pass parking operation leading to an optimally aligned parked motor vehicle only if the parking space is of sufficient size, specifically of sufficient length. However, in particular in cities where motor vehicles are frequently parked along the side of the road parallel with the road's extension, parking spaces are rarely marked. The parking space dimensions thus vary considerably. However, parking spaces of sufficient size in which the motor vehicle may be parked in a single pass with the aid of a park assist system according to conventional arrangements are often difficult to find for a driver. The motor vehicle may thus indeed be parked in the parking space at the end of a single-pass parking step, yet the orientation of the motor vehicle may deviate from a setpoint orientation, which usually is in parallel alignment with a longitudinal edge of the parking space. A single pass operation denotes a parking step in which the motor vehicle is moving continuously and no change in a turn direction of the motor vehicle takes place.

PCT International Published Patent Application No. WO 2004/059408 describes a park assist system in which a subsequent maneuvering direction is indicated to the driver by an arrow. However, the problem of modifying the alignment of a motor vehicle with regard to its orientation in a parking space with the aid of a semi-automatic park assist system is not solved in an altogether optimal manner. The same problem of modifying the alignment of the motor vehicle also arises when the motor vehicle is to be pulled out of the parking space. The goal of a pullout parking operation is to modify the motor vehicle's orientation such that the motor vehicle is subsequently able to be moved out of the parking space in a single pass.

SUMMARY

Example embodiments of the present invention provide a semi-automatic system and a method for operating a system of this type, with whose aid better assistance in the alignment of a motor vehicle in a parking space is provided to a driver of a motor vehicle.

More specifically, a semi-automatic park-steer assist system of a motor vehicle is provided for aiding in an alignment of the motor vehicle in a parking space, which includes a device detecting an activation signal, for a device for determining a change direction in which an alignment of the motor vehicle is to be modified, and a control unit which, in an active state of the park-steer assist system, controls at least one actuator such that steerable wheels of the motor vehicle are turned in the change direction when the drive direction is set to forward, and the steerable wheels are maximally turned counter to the change direction when the set drive direction is reverse. A driver who, for example, has parked his vehicle in a parking space in a single pass but whose vehicle is still not in parallel alignment with the longitudinal edge of the parking space, is now confronted with the task of aligning the motor vehicle in the parking space. If the park-steer assist system is subsequently activated, it must determine the direction in which the orientation of the motor vehicle is to be changed.

If a motor vehicle is backed into parking space extending parallel to the side of the road, a distance to the edge of the parking space, measured at the front end of the motor vehicle, is larger at the end of a first parking step than a distance to the lateral edge of the parking space measured at the rear end of the motor vehicle. This means that the motor vehicle must be steered to the right in a forward movement.

The change direction in such a case therefore is right. As soon as it is determined in which direction the alignment is to be changed, the park-steer assist system then relieves the driver of the task of implementing steering movements of the wheels via the steering wheel. Once the driver engages the forward gear and the forward drive direction is therefore selected, the control unit of the park-steer assist system turns the wheels, for instance maximally in the direction of the change direction (i.e., to the right). The driver is now able to move the motor vehicle forward. If the length of the parking space is insufficient so that the motor vehicle is not yet fully aligned at the end of this forward driving movement, then the driver will engage the reverse gear. The selected drive direction now is reverse. The park-steer assist system thereupon controls the at least one actuator such that the steerable wheels of the motor vehicle are turned counter to the change direction (to the left, in this case), e.g., at the maximum steering angle. In a subsequent backward movement of the motor vehicle, the alignment of the motor vehicle in the direction of its setpoint alignment is improved further. In small parking spaces it may be necessary to execute several forward and backward movements in alternation in order to align the motor vehicle. The provided park-steer assist system has the advantage of completely relieving a driver of time-consuming steering movements. The driver is therefore able to fully concentrate on monitoring the environment of the motor vehicle and on regulating the speed of the motor vehicle. The provided park-steer assist system also prevents an inexperienced driver from inadvertently edging further into the parking space while maneuvering, i.e., his vehicle coming closer and closer to the lateral delimitation of the parking space. The park-steer assist system also may be used for pulling the motor vehicle out. A motor vehicle which is parked in a parallel manner in a parking space on the right side of the road should change its alignment to the left in this instance. As soon as the park assist system has detected an activation signal and recognized left as the change direction, it will turn the motor vehicle wheels to the left, for example at a maximum steering angle, if a forward drive direction is detected. In contrast, if the reverse gear is engaged, then the wheels are turned in the opposite direction, i.e., to the right, at a maximum steering angle, for instance. By single- or multiple-pass maneuvering, the alignment of the vehicle may be modified in the direction of the change direction, so that the motor vehicle is subsequently able to be driven out of the parking space. The device for detecting an activation signal may include, for instance, a switch with whose aid a driver activates the park-steer assist system. It is also possible to provide the device for detecting an activation signal as an interface via which the signal of a higher-level park assist system or another control device is received. As an example, the interface is able to be implemented in software in such a case. The park-steer assist system may, for instance, automatically receive an activation signal from a park assist system, which parks the motor vehicle in the parking space in a single pass or which offers assistance for this purpose, although the motor vehicle is not aligned along a setpoint alignment at the end of this parking operation. The device for determining a change direction may also include a switch and/or a similar device, for instance, via which the driver, by touch or actuation, selects a direction in which the setpoint alignment of the motor vehicle is to be changed. However, the device may also be arranged such that it determines a difference from an instantaneously detected vehicle orientation and a predefined final alignment, and use it to determine a change direction therefrom. In addition, the device for determining the change direction may also include a memory in which the information about a path traced so far or a previous parking operation, for instance, has been stored. For example, if a motor vehicle is parked in parallel on a right side of the road and left there, then it may be concluded from this information that the motor vehicle is to be backed out toward the left in a new startup of the motor vehicle and an activation of the park-steer assist system. The device for detecting a set drive direction may include a sensor, which is situated on an actuating lever or selector lever of a gearing or on an automatic transmission and detects the position of the actuating lever or selector lever. It is also possible to mount one sensor on the gearing.

A parking space is often delimited by another parked motor vehicle at its front and/or its rear end. Since the positions of these other motor vehicles may change while the motor vehicle is parked, leaving the parking space, in particular, is made easier if the control unit is arranged to detect and evaluate distance information from a distance determination unit, such information including information about one or several distances of the motor vehicle from objects that delimit the parking space, in order to determine and output a suggested drive direction on the basis of the detected distance information. For example, if the distance of the motor vehicle from a delimiting object is too low to execute a parking maneuver in the direction of the object, then the driver is informed via an output unit to maneuver the motor vehicle in a driving direction away from the object. The output unit may be any type of display device (e.g., a monitor or touch screen) or a loudspeaker via which acoustic information is output. The output of the control unit is often implemented via an interface with the aid of a signal in electronic form, which is able to be processed by another system of the motor vehicle and converted into audiovisual information for the driver.

The distance determination unit may be equipped with distance-measuring sensors on a front end and rear end of the motor vehicle, and the distance information may include information about a minimum distance of the motor vehicle from a front delimitation and a minimum distance from a rear delimitation of the parking space. This makes it possible to suggest to the driver the particular drive direction in which the motor vehicle is able to travel a maximum path in the course of the parking maneuver even in those instances where the motor vehicle is standing in a parking space that is delimited on both sides. The number of back-and-forth maneuvers may be kept to a minimum in this manner.

The control unit may include a comparator for comparing the one distance or the several distances with at least one distance threshold value, and a warning signal may be output if the at least one distance or one of the several distances undershoots the distance threshold value. The warning signal may vary depending on whether the threshold is exceeded or undershot.

The control unit may be linked to a brake system of the motor vehicle and, if the distance threshold is not attained, a movement of the motor vehicle that results in a further decrease in the one distance or in one of the several distances may be actively braked and/or blocked with the aid of the control unit. This arrangement provides that the motor vehicle does not touch any objects that delimit the parking space. In this manner, the accident risk during parking is reduced considerably if not eliminated entirely.

The control unit may be able to receive signals from one or a plurality of sensor(s) which detect states of the motor vehicle and/or occurrences, the control unit being arranged to evaluate the signals and to influence functions of the park-steer assist system as a function of the evaluation. It is provided, for example, that the signals include information about a steering intervention of a driver of the motor vehicle, and the influencing of the functions of the park-steer assist system includes a deactivation of the park-steer assist system once a steering intervention has been detected. The sensors may, for instance, detect an active steering movement of the driver. As soon as the driver activates the steering system, the park-steer assistance is deactivated. This allows a driver to intervene in the steering at any time, especially in a dangerous situation, without the park-steer assist system impeding this steering intervention. The driver may thus retain complete control over the motor vehicle at all times. It is also possible, for instance, that a warning signal occurs in a driver intervention, whether intentional or not, and the deactivation takes place only thereafter. With small interventions, such as the accidental touching or decelerating of the steering wheel, the park-steer assist system then continues the parking operation. The setpoint trajectory for the parking operation is recalculated in the process, if warranted.

It may also be provided that the signals contain information about a speed of the motor vehicle, and the influencing of the functions of the park-steer assist system includes a deactivation of the park-steer assist system once a predefined speed value is exceeded. In addition, prior to reaching this setpoint value, at least one further, second threshold value may be provided, if appropriate, at which the driver will already be informed about the possible deactivation of the park-steer assist system should the driver increase the speed further. Depending on the extent of the exceeding of the additional threshold value, this warning may vary in intensity, so that, for instance, a higher intensity is selected with a larger exceeding.

In particular when the motor vehicle is leaving a parking space, it may be provided, for example, that as soon as the motor vehicle has attained an orientation that makes it possible for the driver to drive the motor vehicle out of the parking space, he proceeds to do so and in the process approximates the speed of the motor vehicle to a normal driving speed. Since parking operations are carried out at low speed only, the park-steer assist system may be deactivated as soon as a specific speed is exceeded. Other motor vehicle states or occurrences are also detectable and used, individually or in combination, to deactivate the park-steer assist system or also to activate it and influence further functions.

The control unit may include an alignment-determination unit, which compares an instantaneous alignment of the motor vehicle with a setpoint alignment and, if the instantaneous alignment conforms to the setpoint alignment, controls the at least one actuator such that the steerable wheels are moved into a non-deflected center position. In this exemplary embodiment, as soon as the motor vehicle has reached its setpoint alignment, the wheels are steered to a center position, which corresponds to straight forward driving of the motor vehicle. At the conclusion of the alignment operation the motor vehicle is thus prepared for driving parallel to the lateral delimitation of the parking space. This then makes it possible to simply drive the motor vehicle to a center position relative to the length of the parking space.

Undesired parking movements may be avoided in an arrangement in which the signals contain information about a movement state and/or braking state of the motor vehicle, and the influencing of the functions of the park-steer assist system includes the prevention of the control of the at least one actuator for the purpose of bringing about a maximum deflection of the steerable wheels when the motor vehicle is in motion and/or is not braked. For example, in situations in which the motor vehicle rolls in reverse or in which the driver engages the forward gear with an activated clutch, it is possible to prevent the park-steer assist system from actuating the at least one actuator in order to move the wheels to the other maximum deflection already during the backward movement. In this exemplary embodiment, the park-steer assist system executes the steering movements that, for example, lead to a maximum steering angle only if the motor vehicle is braked and/or at rest. Only the steering movement that guides the wheels into a center position once an alignment of the motor vehicle has been attained is possible also in the moving state of the motor vehicle.

The features of the operating method have the same advantages as the features of the park-steer assist system.

Example embodiments of the present invention are explained in greater detail in the following text with reference to the appended Figures.

DETAILED DESCRIPTION

Figure 1:
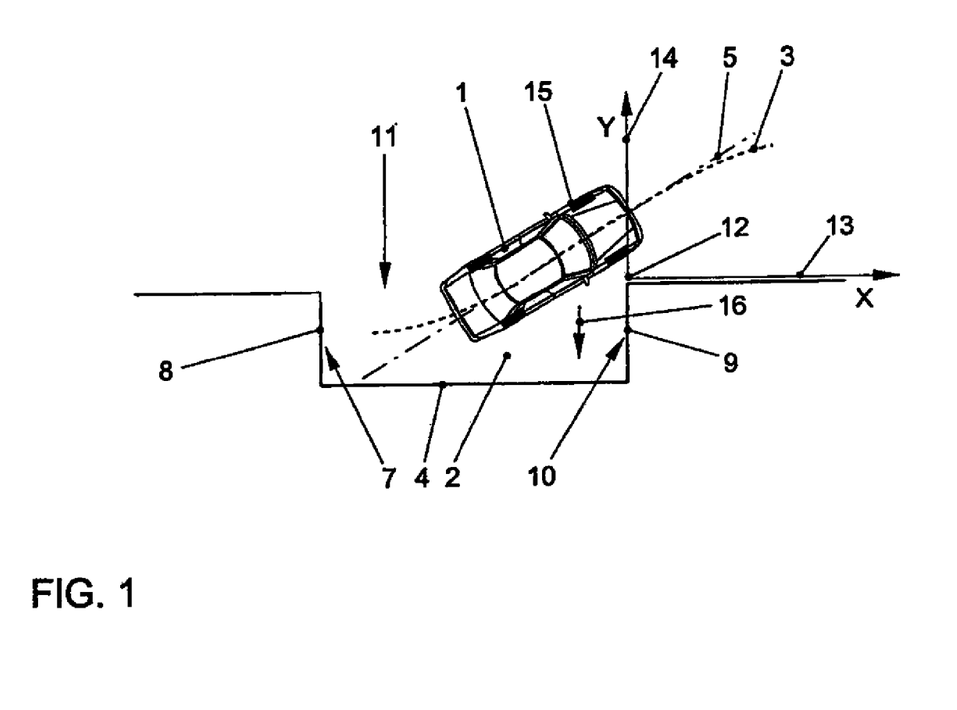
FIG. 1 is a schematic plan view of a parking space and a motor vehicle, as well as a setpoint course for parking the motor vehicle in the parking space.

FIG. 1 shows a motor vehicle 1 during a parking operation into a parking space 2. Motor vehicle 1 is moving along a parking trajectory 3 determined by a parking system. If an extension of parking space 2 along a lateral longitudinal delimitation 4 is not sufficient, then it is impossible to park motor vehicle 1 in parking space 2 such that a longitudinal axis 5 of motor vehicle 1 is in parallel alignment with the lateral longitudinal delimitation 4 of parking space 2 at the end of a single-pass parking operation.

Parking space 2 is delimited by a rear delimitation 8 at a rear end 7. A front delimitation 9 delimits the parking space at a front end 10. Rear delimitation 8 and front delimitation 9 are usually made up of other motor vehicles. Parking space 2 is open on an open side 11 lying across from lateral longitudinal delimitation 4 of parking space 2.

A coordinate system 6 is linked to parking space 2. An origin 12 of coordinate system 6 coincides with a point of intersection of the opposite-lying, open side 11 of parking space 2 with an extension of front delimitation 9 of parking space 2. An x-axis 13 of coordinate system 6 is in parallel alignment with lateral longitudinal delimitation 4 of the parking space. A positive direction of x-axis 13 points from rear delimitation 8 to front delimitation 9 of parking space 2. Coordinate system 6 is a dextral coordinate system. A y-axis 14 of coordinate system 6 thus is aligned perpendicular to lateral longitudinal delimitation 4 of parking space 2. A positive Y-direction points from lateral longitudinal delimitation 4 to opposite-lying open side 11 of parking space 2. An alignment of motor vehicle 1 with reference to coordinate system 6 may be ascertained by determining an angle between the x-axis and longitudinal axis 5 of the motor vehicle.

If the longitudinal extension along lateral longitudinal delimitation 4 of parking space 2 is insufficient, so that motor vehicle 1 is unable to be aligned in parallel with lateral longitudinal delimitation 4 of parking space 2 with regard to its longitudinal axis 5 at the end of a first parking pass. In such a case, motor vehicle 1 must then be moved back and forth in parking space 2 in order to align it in such a way that longitudinal axis 5 of the motor vehicle is in parallel alignment with lateral longitudinal delimitation 4. For this purpose a park-steer assist system is activated by the parking system. The activation may be implemented by an electronic signal. In addition, the parking system transmits a change direction to the park-steer assist system. The alignment of motor vehicle 1 must be modified such that longitudinal axis 5 of the motor vehicle is in parallel alignment with lateral longitudinal delimitation 4 of parking space 2. Using sensors disposed on an actuating lever or gearing or on a travel-direction selector switch of an automatic transmission, a selected or set drive direction is detected. The control unit of the park-steer assist system controls an actuator, which is able to deflect steerable wheels 15 of motor vehicle 1. If an engaged forward gear or a forward direction of travel has been detected as the drive direction, then steerable wheels 15 are maximally deflected (or turned) in the direction that corresponds to the change direction. For motor vehicle 1 depicted in the example shown in FIG. 1, which is still in a non-aligned position at rear end 7 of parking space 2 following the parking operation, this means that steerable front wheels 15 are turned maximally to the right since the change direction is to the right, as indicated by an arrow 16. Motor vehicle 1 then is moved in a forward direction by a driver. This is repeated until longitudinal axis 5 of the motor vehicle is in parallel alignment with lateral longitudinal delimitation 4 of parking space 2 or until the motor vehicle is standing at front end 10 of parking space 2. In the latter case, the driver engages the reverse gear, so that reverse is detected as the drive direction. The control unit thereupon controls the actuator such that steerable front wheels 15 are turned counter to the change direction, i.e., maximally to the left. The driver then moves the motor vehicle in a reverse direction. The back-and-forth maneuvering may be repeated in alternation until parallel alignment of longitudinal axis 5 of the motor vehicle with respect to lateral delimitation 4 of parking space 2 has been achieved. As soon as longitudinal axis 5 of the motor vehicle is in parallel alignment with lateral delimitation 4 of parking space 2, the control unit controls the actuator such that steerable front wheels 15 are set to a center position, which corresponds to a position of straight-forward driving of motor vehicle 1. In this manner, the driver is able to position motor vehicle 1 in the center of parking space 2.

Figure 2A:
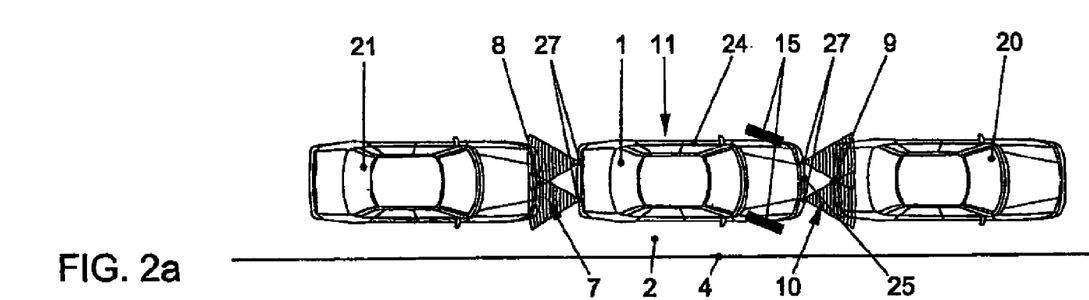
FIGS. 2a through 2c illustrate an operation of a motor vehicle when leaving a parking space, in schematic form.
Figure 2B:
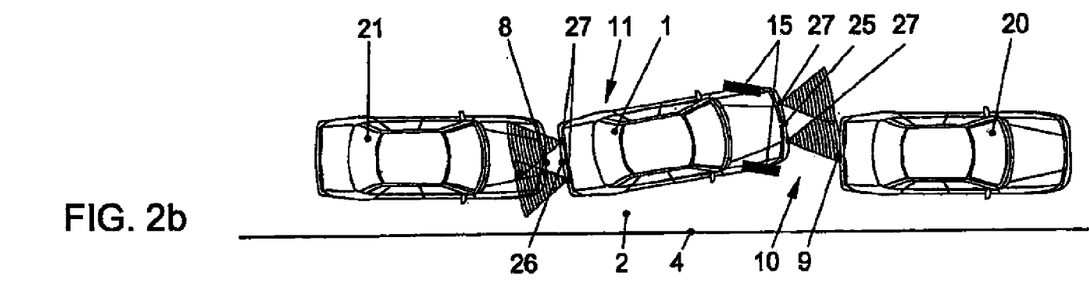
Figure 2C:
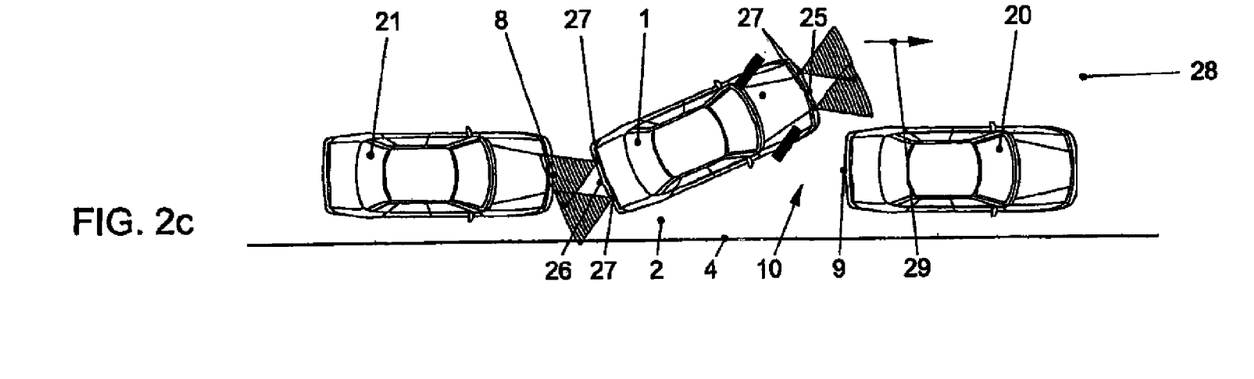

With reference to FIGS. 2*a* to 2*c*, the use of a park-steer assist system for the purpose of leaving a parking space 2 is described. Technically similar features are denoted by the same reference numerals in all of the figures. A motor vehicle 1 is located in parking space 2, which is delimited by an additional motor vehicle 20 at a front end 10. A rear delimitation 8 is defined by another motor vehicle 21. A lateral longitudinal delimitation 4 of parking space 2 is formed by curb 22. After a driver has started operating motor vehicle 1, he signals, by actuating a switch which activates a directional change indicator signal on one side 24 of motor vehicle 1 pointing to open side 11 of parking space 2, that he intends to leave the parking space to the left. This activates the park-steer assist system. With the aid of a distance-determination unit, which evaluates measured data from distance-measuring sensors 27 mounted on a front end 25 of motor vehicle 1 and a rear end 26 of motor vehicle 1, a distance of motor vehicle 1 from front delimitation 9 and rear delimitation 8 of parking space 2 is determined. Distance-measuring sensors 27 may be provided in the form of ultrasonic sensors. However, any other distance-measuring sensors such as radar sensors, laser distance-measuring sensors, etc. may be used as well.

From the distance information of the distance-determination unit the control unit ascertains whether the distance in front of motor vehicle 1 with respect to front delimitation 9, or the distance behind motor vehicle 1 with respect to rear delimitation 8 of parking space 2 is greater. A preferred driving direction is then output to the driver with the aid of an output unit. The output unit may be a visual or acoustic output unit, which, for instance, is connected to the control unit in terms of communication technology via a vehicle bus. In the case at hand, the park-steer assist system recommends to the driver to select reverse as the driving direction to begin with. The driver thereupon engages the reverse gear. This setting of the reverse driving direction is detected by the park-steer assist system, whereupon the control unit triggers an actuator, which turns steerable front wheels 15 to the right to the maximum extent. This direction is counter to the change direction, which points to the left and is indicated by an arrow 16. The driver then moves motor vehicle 1 in reverse, into a position illustrated in FIG. 2*b*.

A comparator compares the distance of motor vehicle 1 from front delimitation 9 and rear delimitation 8 of parking space 2. If a distance threshold value is not attained, then a warning is output via the output unit. The output warning may include information about the actual distance. For instance, an intermittent warning sound may be output in the beginning, which turns into a continuous tone given a lower distance of motor vehicle 1 from front delimitation 9 or from rear delimitation 8. In response, the driver stops motor vehicle 1. Then, the forward gear is engaged. The park-steer assist system detects the setting of a different drive direction. The control unit thereupon controls the actuator such that steerable front wheels 15 are turned maximally to the left, which corresponds to the direction in which a change in the alignment of motor vehicle 1 is to take place. The driver then moves motor vehicle 1 in a forward direction. In so doing, an alignment of motor vehicle 1 that is sufficient to pull out of parking space 2 in one pass without any difficulties is achieved. Thus, the driver will pull motor vehicle 1 into a road lane 28 and increase the speed. In addition, he will activate the steering system in order to align motor vehicle 1 in a driving direction 29 parallel to the extension of the road. The park-steer assist system is automatically deactivated when, for instance, a predefined speed such as 10 km/h is exceeded. A driver intervention in the steering system of the motor vehicle will lead to a deactivation of the park-steer assist system.

Figure 3:
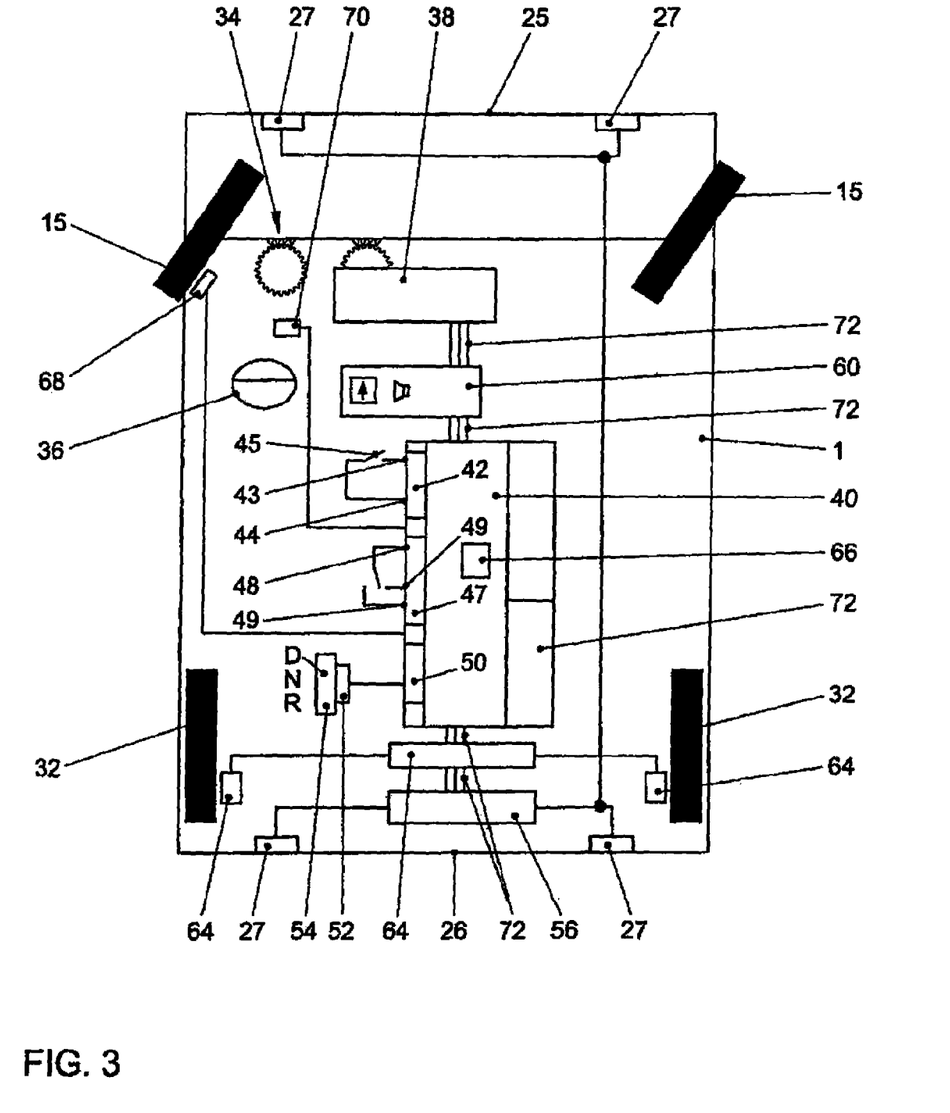
FIG. 3 is a schematic representation of a motor vehicle having a park-steer assist system.

FIG. 3 schematically shows a motor vehicle 1 equipped with a park-steer assist system 30. Motor vehicle 1 includes rear wheels 32 and steerable front wheels 15. Steerable front wheels 15 may be deflected via a steering system 34, which includes a steering wheel 36. In addition, steerable front wheels 15 are deflectable via an actuator 38. Actuator 38 is able to be controlled with the aid of a control unit 40 of park-steer assist system 30. Actuator 38 may be a component of steering system 34, which is used, for instance, to facilitate a steering movement of steering wheel 36. Park-steer system 30 includes a device for detecting an activation signal 42. The device includes an input 43 and an output 44. Input 43 and output 44 are connected via a switch 45. If switch 45 is closed, then an electric connection is established between input 43 and output 44. In this manner, the device for receiving an activation signal 42 receives an activation signal and activates park-steer assist system 30.

Via a two-way pushbutton switch 46, which is activated by a driver, a change direction is able to be set, which specifies in which direction the alignment of motor vehicle 1 is to be changed with the aid of park-steer assist system 30. Two-way pushbutton switch 46 is connected to device for determining change direction 47. In the exemplary embodiment shown, the device for determining change direction 47 may include an additional output 48 and two additional inputs 49. If two-way pushbutton switch 46 is activated, then an electric connection is established between additional output 48 and one of additional inputs 49. The change direction is specified as a function of which one of additional outputs 49 detects a signal. In other example embodiments, the device for determining the change direction may also analyze signals from different sensors and/or information from different control devices of the motor vehicle in order to automatically determine, on their own, based on specified criteria, in which direction the alignment is to be changed. For example, if the motor vehicle is additionally equipped with a parking assistant which is able to park the motor vehicle into a parallel parking space in one pass in reverse, then information from this park assistant may be utilized to determine a change direction. It is possible to acquire measured data of the driving state and store them, if appropriate, in order to determine the change direction on the basis of these data. This is especially helpful if the park-steer assist system is to be used for leaving a parking space. If the park-steer assist system is activated after the motor vehicle was parked, then the change direction may usually be derived from the data pertaining to the prior parking operation. For example, if the motor vehicle was driven in reverse when parking in a parallel parking space on the right side of the road, then the change direction in the parking operation was right. As a consequence, the change direction for leaving the parking space must then be left.

The device for detecting a set drive direction 50 is linked to a sensor 52 on a selector lever 54 of an automatic transmission. Sensor 52 detects the position of selector lever 54. In addition, motor vehicle 1 includes a distance-determination unit 56. Distance-determination unit 56 is equipped with distance sensors, which are disposed on a front end 25 and a rear end 26 of motor vehicle 1. Distance-determination unit 56 determines distances of objects that delimit the parking space into which, or out of which, the motor vehicle is to be parked. Control unit 40 is arranged such that it is able to receive and evaluate distance information from distance-determination unit 56. Using the received distance information, the control unit determines a driving direction recommendation in which motor vehicle 1 preferably is to be moved when maneuvering for the purpose of aligning motor vehicle 1. To this end, control unit 40 supplies a drive-direction recommendation, which is output via an output unit 60. Output unit 60 may be any type of audio-visual output unit. Output unit 60 is connected to control unit 40 of park-steer assist system 30 in terms of communication technology via a vehicle bus system 62, as are actuator 38 and distance-determination unit 56. In addition, control unit 40 controls actuator 38 as a function of the detected set drive direction and the determined change direction.

To prevent motor vehicle 1 from hitting the front or rear delimitation of the parking space, the control unit is linked to a brake system 64 via the vehicle bus system. If, based on the distance information, control unit 40 determines with the aid of a comparator 66 that a distance to an object delimiting the parking space undershoots a distance threshold value, then control unit 40 may, for one, output a warning via output unit 60 and/or, for another, actively brake the movement of motor vehicle 1 via brake system 64. Furthermore, it may be provided that the control unit is able to control actuator 38 so as to induce a maximum deflection of front wheels 15 only if motor vehicle 1 is braked. A wheel pulse sensor 68 supplies speed information to control unit 40 so that park-steer system 30 is able to be deactivated once a predefined speed, e.g., 10 km/h, has been exceeded. An additional sensor 70, by which steering interventions of a driver are able to be detected, is situated at steering system 34. If a steering movement of the driver is detected while park-steer assist system 30 is active, then it will be deactivated automatically.

If motor vehicle 1 is being parked, then an alignment-determination unit 72 ascertains whether an instantaneous alignment of the motor vehicle corresponds to a setpoint alignment. The alignment-determination unit is connected to control unit 40 via vehicle bus system 62, so that the control unit is able to control actuator 38 such that steerable wheels 15 are moved into a non-deflected center position if the instantaneous alignment of motor vehicle 1 corresponds to the setpoint alignment.

The actuator, the output unit, the distance-determination unit, as well as the sensors and switches are described as autonomous units of the motor vehicle in the exemplary embodiment described. The switches may be integrated in control devices, which are connected to the control unit via the vehicle bus system. Other detection devices are able to be utilized as well. However, there are also example embodiments in which all or some of these components are integral components of the park-steer assist system. It is irrelevant in this context that individual components are situated at different locations in the motor vehicle.

The individual components of the park-steer assist system may be implemented entirely or partially in hardware and/or software, or be at least partially integrated in a control device having a programmable computer.

The above-mentioned examples describe the parking of a motor vehicle in a parking space on the right side of the road. The same also applies analogously to parking in a parking space on the left side of the road.

LIST OF REFERENCE NUMERALS 1 motor vehicle
2 parking space
3 parking trajectory
4 lateral longitudinal delimitation of the parking space
5 longitudinal axis of the motor vehicle
6 coordinate system
7 rear end of the parking space
8 rear delimitation of the parking space
9 front delimitation of the parking space
10 front end of the parking space
11 open side of the parking space lying on the opposite side
12 origin
13 x-axis
14 y-axis
15 steerable front wheels
16 arrow indicating the change direction
20 additional motor vehicle
21 other motor vehicle
22 curb
24 side of the vehicle
25 front end of the motor vehicle
26 rear end of the motor vehicle
27 distance sensors
28 roadway
29 travel direction
30 park-steer assist system
32 rear wheels
34 steering system
36 steering wheel
38 actuator
40 control unit
42 device for detecting an activation signal
43 input of the device for detecting an activation signal
44 output of the device for detecting an activation signal
45 switch
46 two-way pushbutton switch
47 device for determining the change direction
48 additional output (of the device for detecting the change direction)
49 additional inputs (of the device for detecting the change direction)
50 device for detecting a set drive direction
52 sensor on the selector lever of a transmission
54 selector lever of a transmission
56 distance-determination unit
60 output unit
62 vehicle bus
64 brake system
66 comparator
68 wheel pulse sensor
70 additional sensor at the steering system
72 alignment determination unit

The invention claimed is:

1. A semi-automatic park-steer assist system of a motor vehicle for aiding in an alignment of the motor vehicle in a parking space, comprising:
a device configured to detect an activation signal;
a device configured to determine a change direction in which an alignment of the motor vehicle is to be changed;
a control unit configured to control at least one actuator in an active state of the park-steer assist system to deflect steerable wheels of the motor vehicle in the change direction when a set drive direction is forward and to deflect the steerable wheels counter to the change direction when the set drive direction is reverse;
wherein the control unit includes an alignment-determination unit configured to compare an instantaneous alignment of the motor vehicle with a setpoint alignment, and, if the instantaneous alignment corresponds to the setpoint alignment, to control the actuator to move the steerable wheels into a substantially non-deflected center position.

2. The park-steer assist system according to claim 1, wherein the control unit is configured to control the actuator to maximally deflect the steerable wheels of the motor vehicle in the change direction when the set drive direction is forward and to maximally deflect the steerable wheels counter to the change direction when the set drive direction is reverse.

3. The park-steer assist system according to claim 1, wherein the control unit is configured to detect and analyze distance information from a distance-determination unit that includes information about at least one distance of the motor vehicle from objects that delimit the parking space to determine and output a suggested drive direction in accordance with the detected distance information.

4. The park-steer assist system according to claim 3, wherein the distance-determination unit includes distance-measuring sensors at a front end and a rear end of the motor vehicle, the distance information including information about at least one distance of the motor vehicle from a front delimitation and at least one distance from a rear delimitation of the parking space.

5. The park-steer assist system according to claim 3, wherein the control unit includes a comparator configured to compare the distance to at least one distance threshold value, and to output at least one warning signal if the distance undershoots the distance threshold value.

6. The park-steer assist system according to claim 5, wherein the control unit is configured to at least one of (a) actively brake and/or (b) prevent a movement of the motor vehicle that leads to a further reduction in the distance if the distance threshold value is not attained.

7. The park-steer assist system according to claim 1, wherein the control unit is configured to receive signals from at least one sensor that detects at least one of (a) motor vehicle states and/or (b) occurrences, the control unit configured to evaluate signals and to influence functions of the park-steer assist system as a function of the evaluation.

8. The park-steer assist system according to claim 7, wherein the signals include information about a steering intervention of a driver of the motor vehicle, and the influence of the functions of the park-steer assist system includes a deactivation of the park-steer assist system upon detection of the steering intervention.

9. The park-steer assist system according to claim 7, wherein the signals include information about a speed of the motor vehicle, and the influence of the functions of the park-steer assist system includes a deactivation of the park-steer assist system if a predefined speed value is exceeded.

10. The park-steer assist system according to claim 7, wherein the signals include information about at least one of (a) a moving state and/or (b) a braking state of the motor vehicle, and the influence of the functions of the park-steer assist system includes blocking of the control of the actuator to bring about a deflection of the steerable wheels if the motor vehicle is at least one of (a) moving and/or (b) not braked.

11. A method for operating a semi-automatic park-steer assist system of a motor vehicle for aiding in an alignment of the motor vehicle in a parking space, comprising:
    detecting an activation signal;
    determining a change direction in which an alignment of the motor vehicle is to be changed; and
    controlling at least one actuator with the aid of a control unit in an active state of the park-steer assist system to deflect steerable wheels of the motor vehicle in the change direction when the set drive direction is forward, and to deflect the steerable wheels counter to the change direction when the set drive direction is reverse;
    wherein the control unit includes an alignment-determination unit, the method further comprising:
    comparing, by the alignment-determination unit, an instantaneous alignment of the motor vehicle with a setpoint alignment; and
    if the instantaneous alignment corresponds to the setpoint alignment, controlling, by the alignment determination unit, the actuator to move the steerable wheels to a substantially non-deflected center position.

12. The method according to claim 11, wherein the controlling of the actuator is performed by a control unit in the active state of the park-steer assist system to maximally deflect the steerable wheels of the motor vehicle in the change direction when the set drive direction is forward, and to maximally deflect the steerable wheels counter to the change direction when the set drive direction is reverse.

13. The method according to claim 11, further comprising:
    determining distance information, that includes information about at least one distance of the motor vehicle from objects that delimit the parking space, with the aid of a distance-determination unit; and
    determining and outputting, by the control unit, a suggested drive direction in accordance with the distance information.

14. The method according to claim 13, further comprising:
    comparing the distance to a distance threshold value with the aid of a comparator of the control unit; and
    outputting a warning signal if the distance undershoots the distance threshold value.

15. The method according to claim 13, the method further comprising at least one of (a) actively braking and/or (b) preventing movement of the motor vehicle, by the control unit, that leads to a further decrease in the distance if a distance threshold value is not attained.

16. The method according to claim 11, further comprising:
    receiving, by the control unit, signals from at least one sensor, that detects at least one of (a) states of the motor vehicle and/or (b) occurrences;
    analyzing the signals by the control unit; and
    influencing functions of the park-steer assist system, by the control unit, as a function of the evaluation.

17. The method according to claim 16, wherein the signals include information about a speed of the motor vehicle, and the control unit influences the functions of the park-steer assist system in that the park-steer assist system is deactivated when a predefined speed value is exceeded.

18. The method according to claim 16, wherein the signals include information about a steering intervention of a driver of the motor vehicle, and the control unit influences the functions of the park-steer assist system in that the park-steer assist system is deactivated when a steering intervention is detected.

19. The method according to claim 16, wherein the signals include information about at least one of (a) a moving state and/or (b) a braking state of the motor vehicle, and the control unit influences the functions of the park-steer assist system in that the control of the actuator for bringing about a maximum deflection of the steerable wheels is prevented if the motor vehicle is at least one of (a) in motion and/or (b) not braked.

20. The method according to claim 13, wherein the distance-determination unit includes distance-measuring sensors on a front end and a rear end of the motor vehicle, and the distance information includes information about a minimum distance of the motor vehicle from a front delimitation and a minimum distance from a rear delimitation of the parking space.

* * * * *